United States Patent
Chen et al.

(10) Patent No.: US 7,760,735 B1
(45) Date of Patent: Jul. 20, 2010

(54) METHOD AND SYSTEM FOR DISCOVERING NETWORK PATHS

(75) Inventors: Jun Chen, Sunnyvale, CA (US); Joon Suan Ong, Mountain View, CA (US); Jason Marc Simmons, Mountain View, CA (US); Arjun Singh, Palo Alto, CA (US); Michael John Wakerly, Mountain View, CA (US)

(73) Assignee: Google Inc., Mountain View, CA (US)

( * ) Notice: Subject to any disclaimer, the term of this patent is extended or adjusted under 35 U.S.C. 154(b) by 684 days.

(21) Appl. No.: 11/703,461

(22) Filed: Feb. 6, 2007

(51) Int. Cl.
- H04L 12/26 (2006.01)
- H04J 1/16 (2006.01)
- G06F 11/00 (2006.01)
- G08C 15/00 (2006.01)
- G01R 31/08 (2006.01)

(52) U.S. Cl. .................. 370/392; 370/245; 370/395; 709/238

(58) Field of Classification Search ......... 370/252–255, 370/238–244, 331–392, 395–443; 709/221–224, 709/236–242
See application file for complete search history.

(56) References Cited

U.S. PATENT DOCUMENTS

| | | | |
|---|---|---|---|
| 6,205,122 B1 * | 3/2001 | Sharon et al. | 370/254 |
| 6,397,248 B1 * | 5/2002 | Iyer | 709/223 |
| 6,405,248 B1 * | 6/2002 | Wood | 709/223 |
| 6,442,615 B1 * | 8/2002 | Nordenstam et al. | 709/241 |
| 6,502,130 B1 * | 12/2002 | Keeler et al. | 709/223 |
| 6,728,214 B1 * | 4/2004 | Hao et al. | 370/241 |
| 7,293,106 B2 * | 11/2007 | Natarajan et al. | 709/238 |
| 7,342,893 B2 * | 3/2008 | Barkai et al. | 370/245 |
| 7,453,884 B2 * | 11/2008 | Ma | 370/395.32 |
| 2004/0202177 A1 * | 10/2004 | Tachikawa | 370/395.1 |

* cited by examiner

*Primary Examiner*—Man Phan
(74) *Attorney, Agent, or Firm*—Park, Vaughan & Fleming LLP; Shun Yao

(57) ABSTRACT

One embodiment of the present invention provides a system that identifies network switches along a path. During operation, the system receives an address of a source node and an address of a destination node. The system maintains a set of topology information for a network. The system further simulates a data packet originated at the source node and destined for the destination node. During the simulation, the system determines whether a current-hop node performs layer-3, layer-2, or sub-layer-2 switching. The system sends a query to the current-hop node over a separate control channel to determine the status of the current-hop node and discover a next-hop node. The system then receives a reply. The system determines the next-hop node based on the reply and sets the next-hop node as the current-hop node.

18 Claims, 4 Drawing Sheets

METHOD AND SYSTEM FOR DISCOVERING NETWORK PATHS

BACKGROUND

1. Field of the Invention

The present invention relates to the design of digital networks. More specifically, the present invention relates to a method and system for discovering network paths which include both layer-2 and layer-3 switches.

2. Related Art

Hi-performance web sites often rely on "server farms"—hundreds of networked computers performing similar tasks—for scalability, reliability, and fast response time. Deploying these server farms typically requires the power of a high-speed, versatile network to provide reliable connectivity and sufficient bandwidth among the servers.

Conventionally, servers are interconnected through IP routers which process packets on layer-3, or the IP layer. By processing every packet's IP header based on routing tables, IP routers provide flexibility and re-configurability. However, such heavy processing also imposes constraints on router speed. Consequently, high-speed ports on an IP router are expensive, and building an entire server-farm network using only IP routers can be very costly.

One way to lower network costs is to combine the versatility of IP routers with the inexpensive high bandwidth available in layer-2 switches. Layer-2 switches require less per-packet processing and, hence, can provide high-speed ports at a lower cost. The most widely deployed layer-2 switch is the Ethernet switch, which forwards Ethernet frames based on layer-2 forwarding tables. Moreover, the recently ratified standard for 10-Gigabit Ethernet (10 GbE) further unleashes the power of fiber-optic transmission and allows high-speed Ethernet switches to inter-operate with a wide range of legacy equipment. Other proprietary layer-2 or sub-layer-2 protocols facilitate the construction of large-scale, high-speed Ethernet switch fabrics. A typical topology of such a network includes layer-3 switches located at the "edge" of the network, providing access connectivity to the servers, and layer-2 or sub-layer-2 switches located in the "core," providing high-speed inter-connectivity to the layer-3 switches.

During a network's operation, maintaining accurate knowledge of the network state is critically important for reliable service provisioning. Hence, a network operator needs effective tools to monitor the network state and the health of each switch. In a conventional IP network, one can identify the route from a source to a destination using the traceroute command, which returns the IP address and response time of each IP router along the path. In a multi-tier network with layer-3, layer-2, and sub-layer-2 switches, however, the traceroute command becomes insufficient, because the switches operating below layer-3 are "invisible" to the traceroute command.

Hence, what is needed is a method and a system that facilitates discovery of switching devices on layer-3 and lower layers along a network path.

SUMMARY

One embodiment of the present invention provides a system that identifies network switches along a path. During operation, the system receives an address of a source node and an address of a destination node. The system also maintains a set of topology information for a network which includes layer-3, layer-2, and sub-layer-2 switches. The system simulates a data packet originated at the source node and destined for the destination node. During the simulation, the system determines whether a current-hop node performs layer-3, layer-2, or sub-layer-2 switching. The system further sends a query to the current-hop node over a separate control channel to determine the status of the current-hop node and discover the next-hop node. The system then receives a reply from the current-hop node in response to the query. Subsequently, the system determines the next-hop node based on the reply and sets the next-hop node as the current-hop node. The system records the identifiers for all the switches along a path from the source node to the destination node.

In a variation on this embodiment, determining whether the current-hop node performs layer-3, layer-2, or sub-layer-2 switching includes looking up network topology information. If the current-hop node performs layer-3 switching, sending a query to the current-hop node includes sending a query to the node's layer-3 switching table. Additionally, receiving a reply from the current-hop node includes receiving an address of the next layer-3 node along the path. Furthermore, the system identifies an egress interface at the current-hop node, and determines the status of the identified egress interface at the current-hop node by querying an Interface Manager.

In a further variation, the system identifies the interface at the end host coupled to an edge switch by querying the Address Resolution Protocol (ARP) table of the edge switch. Furthermore, identifying an egress interface at the current-hop node includes querying ARP table to obtain an interface index. Determining the status of the egress interface at the current-hop node includes querying an Interface Manager for the status of the identified egress interface.

In a variation on this embodiment, determining whether the current-hop node performs layer-3, layer-2, or sub-layer-2 switching includes looking up the network topology information. If the current-hop node performs only sub-layer-2 switching, finding the next sub-layer-2 switch along the path includes looking up the network topology information. The system further identifies an egress interface at the current-hop node by looking up network topology information and determines the status of the identified egress interface at the current-hop node by querying an Interface Manager.

In a variation on this embodiment, if the current-hop node performs layer-3 switching, the system queries the current-hop node's IP routing table. If the current-hop node supports equal-cost multiple-path (ECMP) selection in its IP routing table, the current-hop node returns multiple next-hop layer-3 nodes which result in multiple paths leading to the destination node. The system further selects an exact path by simulating an ECMP-selection schemes that includes a hash operation performed by the current-hop node.

In a variation on this embodiment, the system displays each node's address and/or node identifier, ingress interface, and egress interface along the path.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Note that the word "node" herein refers generally to any networking equipment, such as a switch, a switch module, or a switch chip operating on layer-3, layer-2, sub-layer-2, or any proprietary or open-standard layer. Furthermore, according to the Open Systems Interconnection (OSI) model, "layer-3" refers to the network layer, such as the IP layer. "Layer-2" refers to the data link layer, such as the Ethernet layer. "Sub-layer-2" refers to any open-standard or proprietary layer that operates below layer-2.

Overview

High-throughput IP networks are typically built upon layer-2 and/or sub-layer-2 switched networks. Such multi-tier networks can provide inexpensive high-speed connectivity to server farms, where small network latency and high throughput are critically important.

Figure 1:
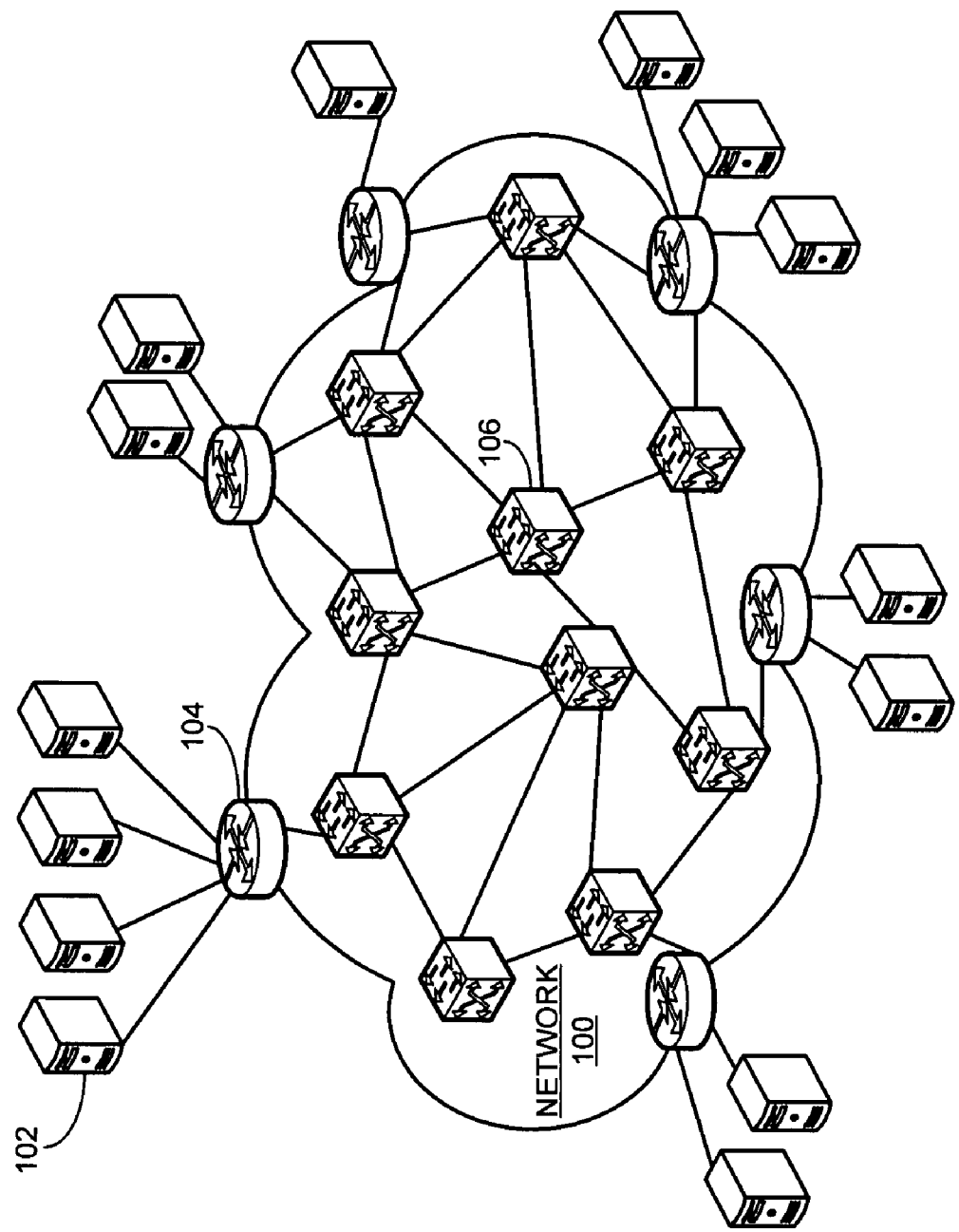
FIG. 1 illustrates an exemplary two-tier network including layer-3 and layer-2 switches.

FIG. 1 illustrates an exemplary two-tier network which includes layer-3 and layer-2 switches. Layer-3 switches, such as switch 104, reside at the edge of a two-tier network 100 and provide access connectivity to end hosts, such as server 102. Layer-2 switches, such as switch 106, form a mesh-topology network at the core of network 100 and provide interconnectivity to the layer-3 switches. Currently, the most ubiquitous layer-3 switches are IP routers, while Ethernet switches are arguably the most prevalent layer-2 switches. Note that the word "switch" and "router" are used interchangeably herein, both meaning a piece of networking equipment capable of switching or forwarding a data packet, which can also be referred to as a cell, frame, or datagram on different networking layers according to the OSI model. Note further that "switching" and "forwarding" are also used interchangeably herein, both meaning the process of determining the next-hop node for a packet and sending the packet to the appropriate output port or interface.

In a two-tier network like network 100, an edge layer-3 switch is only one layer-3 hop away from another layer-3 switch, because the layer-2 switches form a mesh network interconnecting the layer-3 switches. Furthermore, the layer-2 switches are "invisible" to the layer-3 switches, because a layer-3 packet is generally encapsulated in a layer-2 frame. The layer-2 switches only process layer-2 packet headers, and the layer-3 switches only process layer-3 headers.

This tiered network architecture, while providing scalability, also presents a challenge for network monitoring. A network operator can monitor the layer-3 switches along a path from a source host to a destination host by issuing a traceroute command, which obtains the IP addresses and response times of the intermediary layer-3 switches by varying the time-to-live (TTL) values in the IP headers of packets transmitted from the source host. However, the traceroute command cannot identify layer-2 or sub-layer-2 switches along the path, because these switches do not process IP headers. Hence, the network operator cannot identify and monitor the state of layer-2 or sub-layer-2 switches along a path in network 100.

Multi-Layer Switching for Server Farms

Figure 2:
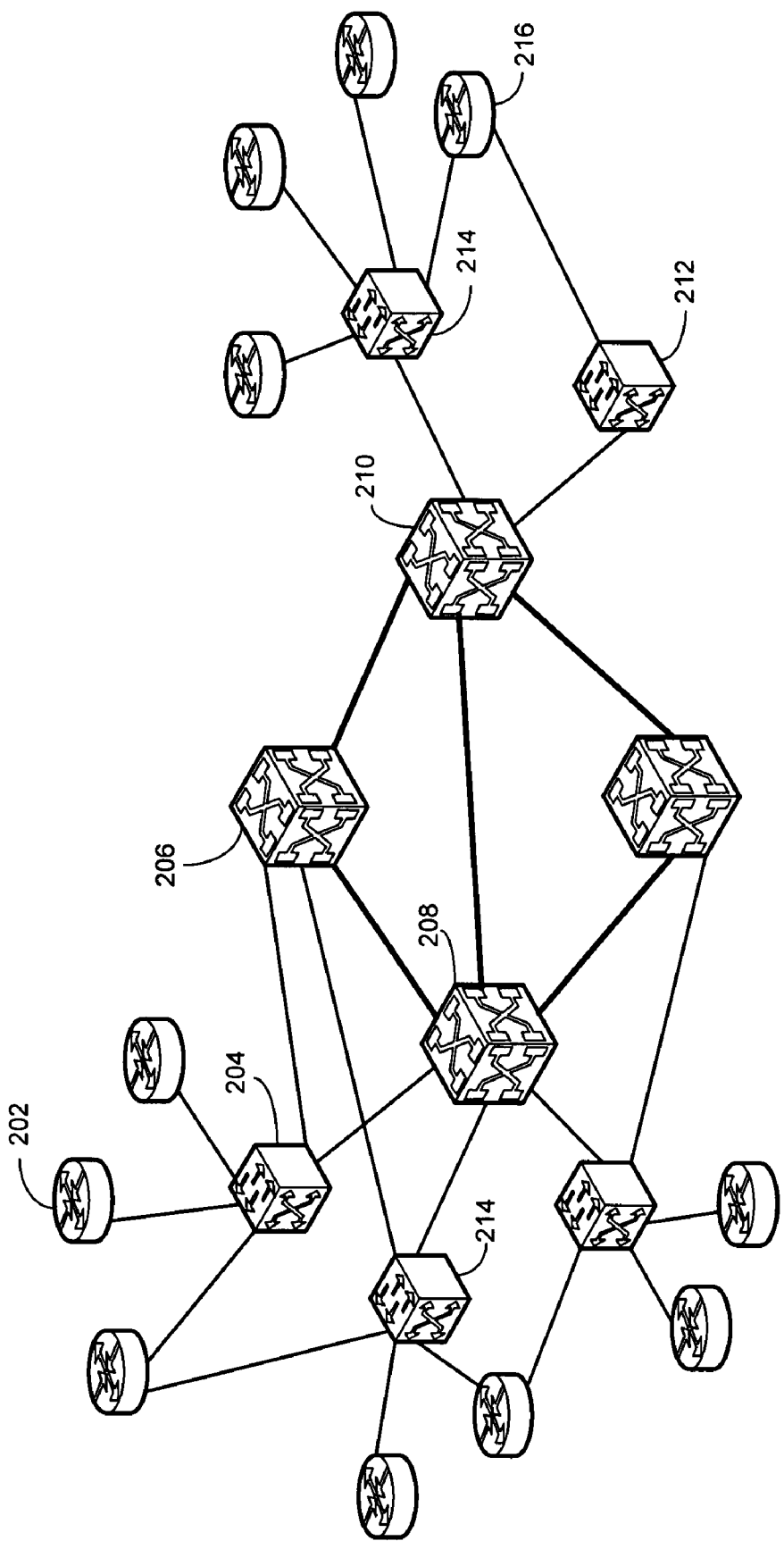
FIG. 2 illustrates an exemplary three-tier network including layer-3, layer-2, and sub-layer-2 switches in accordance with an embodiment of the present invention.

FIG. 2 illustrates an exemplary three-tier network including layer-3, layer-2, and sub-layer-2 switches in accordance with an embodiment of the present invention. Layer-3 switches, such as IP router 202, are coupled to the layer-2 switches, such as Ethernet switch 204. Each layer-2 switch is further coupled to one or more sub-layer-2 switches, which provide connectivity for these layer-2 switches. For example, Ethernet switch 204 is coupled to sub-layer-2 switches 206 and 208. The sub-layer-2 switches are coupled to form an underlying network which provides the backbone connectivity. This sub-layer-2 network can be based on any topology, such as a ring, a bus, a tree, or a mesh topology.

Note that a sub-layer-2 switch can be based on any open or proprietary communication protocols. For example, a sub-layer-2 switch can encapsulate Ethernet frames with proper sub-layer-2 headers to facilitate switching by other sub-layer-2 switches. Sub-layer-2 switches can also be used to stack multiple Ethernet switches to construct large switch fabrics. Embodiments of the present invention are not limited to one particular type of sub-layer-2 switch. Any open-standard or proprietary sub-layer-2 switches can be employed in these embodiments.

In further embodiments, layer-3, layer-2, and sub-layer-2 switches can be combined or stacked, and form a multi-layer, high-capacity switch fabric. Furthermore, the layer-3, layer-2, and sub-layer-2 switches can be stand-alone switches, switch chips, switch boards, or line cards, and can be plugged into a common chassis or backplane. For example, one can construct a high-capacity switch fabric using sub-layer-2 switch chips and GbE switch chips, in which case the switch fabric itself is a two-layer network. In addition, a switch chip can also combine layer-3 and layer-2, or layer-2 and sub-layer-2 switching functions. For instance, on such a layer-3/layer-2 switch chip, certain ports are layer-3 (e.g., IP) ports, and others are layer-2 (e.g., Ethernet) ports. On a layer-2/sub-layer-2 switch chip, certain ports are layer-2 (e.g., Ethernet) ports, and others are sub-layer-2 ports.

In general, multiple paths may exist for the same source and destination. For example, as is illustrated in FIG. 2, a packet from IP router 202 and destined to IP router 216 can take two routes: switch 202 (IP)-switch 204 (Ethernet)-switch 206 (sub-layer-2)-switch 210 (sub-layer-2)-switch 214 (Ethernet)-switch 216 (IP); and switch 202 (IP)-switch 204 (Ethernet)-switch 208 (sub-layer-2)-switch 210 (sub-layer-2)-switch 212 (Ethernet)-switch 216 (IP). These two paths are considered to be of equal costs when hop count is used as the cost metric. Other equal-cost paths may also exist. When a switch can chose from multiple equal-cost paths to route a packet, the switch can adopt an equal-cost multiple-path selection scheme to more evenly distribute the traffic. In one embodiment, the switch can select a path for a packet based on a hash generated from the values of given fields of the packet.

In one embodiment, each switch is assigned IP addresses and MAC addresses for its interfaces. Each switch is also identifiable by a switch identifier. Furthermore, a network control station maintains the topology information of all the switches in the entire network as is shown in FIG. 2. That is, the network control station maintains the interface-to-interface connectivity information for all the layer-3, layer-2, and sub-layer-2 switches.

Path Discovery Through a Network Control Station

Embodiments of the present invention provide a system that facilitates discovery and monitoring of layer-3, layer-2, and sub-layer-2 switches in a multi-layer network. In one embodiment, the system resides in a network control station with access to each switch's switching or forwarding table as well as the network topology. The system simulates a packet originated at a source node identified by a source IP address, and destined to a destination node identified by a destination IP address. The system initiates queries to the switches. Based on the responses and the network topology, the system can construct a path from source to destination and obtain state information for every intermediary switch along the path.

In general, layer-3 switching typically occurs when a packet arrives at a Gigabit Ethernet (GbE) or a 10 GbE port of a layer-3 switch. In case of a destination lookup failure, the layer-3 switch drops the packet. In contrast, a layer-2 switch floods the packet to every outgoing layer-2 port if the layer-2 switching table does not contain an entry for the packet's destination, since the layer-2 forwarding table is populated through flooding and automatic learning. Hence, the system cannot reliably trace a path through layer-2 switches by simply querying layer-2 forwarding tables. In one embodiment, the system determines a next-hop layer-2 switch based on the topology information available at the network control workstation. After obtaining the address of the next-hop layer-2 switch, the system further queries the status of the corresponding outgoing layer-2 interfaces to ensure that the link leading to the next-hop layer-2 switch is healthy.

To discover a sub-layer-2 path, the system performs a lookup based on the network topology to determine the next-hop sub-layer-2 switch. In one embodiment, when multiple layer-2 or sub-layer-2 paths are present leading to a common next-hop layer-3 switch, a query to the previous layer-3 node's routing table results in an egress interface, which indicates the next layer-2 or sub-layer-2 hop. The system chooses the next-hop layer-2 or sub-layer-2 switch based on the network topology. In a further embodiment, the system chooses one of the available layer-2 or sub-layer-2 paths using static mapping. That is, traffic from an ingress port is forwarded via a deterministic egress port.

Figure 3:
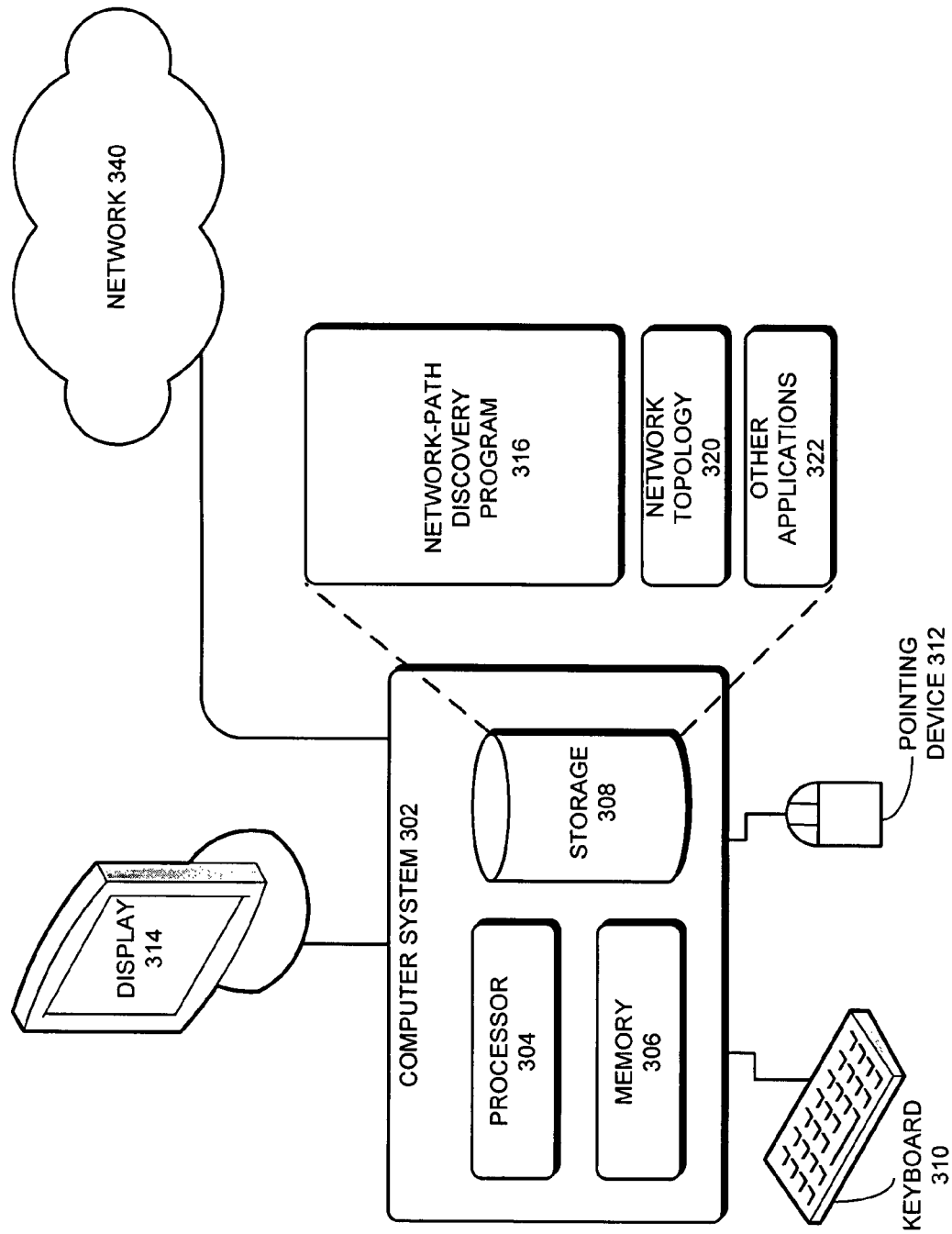
FIG. 3 illustrates an exemplary computer system for discovering switches at different layers along a network path in accordance with one embodiment.

FIG. 3 illustrates an exemplary computer system for discovering switches at different layers along a network path in accordance with one embodiment. A computer system 302 includes a processor 304, a memory 306, and a storage 308. Computer system 302 is also coupled to a display 314, and input devices such as a keyboard 310 and a pointing device 312. Computer system 302 has access to the control plane of a network 340. That is, computer system 302 can access the switching tables, interface managers, and other administrative tools of the switching nodes within network 340. In one embodiment, these switching nodes can be IP routers, Ethernet switches, or sub-layer-2 switches, and each switching node can be identified by a unique network address such as an IP address.

Storage 308 stores a network-path discovery program 316, network topology information 320 for network 340, and other applications 322. During operation, computer system 302 executes network-path discovery program 316, and discovers the switching nodes on different layers along a path for a given source-destination pair in network 340, in part based on network topology information 320. Network topology information 320 can be stored in various formats. For example, network topology information 320 can be a file which describes the interface connectivity of all the switching nodes within network 340.

In one embodiment, network-path discovery program 316 queries switch-control and configuration information, such as switching tables and interface managers, at different switching nodes. Computer system 302 can perform such queries through secure remote access, for example by initiating a Secure Socket Layer (SSL) connection, to each switching node within network 340.

Path-Discovery Process

The description below corresponds to a path-discovery process for an exemplary network. However, the path-discovery process described herein is not limited to this network which includes layer-3, layer-2, and sub-layer-2 switches. Generally, this path-discovery process is applicable in any multi-tier networks, such as the network illustrated in FIGS. 1 and 2.

In general, the system discovers a path based on the network topology information, routing information, and interface status at each switch along the path. In one embodiment, a configuration file provides the network topology information. A layer-3 switching table provides routing information at a given switch chip. An Interface Manager, which is typically a process running on a switch, provides the status information for the interfaces on that. The system can access a switch's layer-3 switching table or Interface Manager via an out-of-band network which is separate from the network links used for data transmission. Note that the terminology "out-of-band" refers to communication channels that are separate from channels carrying user data. That is, the out-of-band network belongs to the control plane, separate from the data plane. An out-of-band channel can be based on any available communication mechanism, such as a secure remote TCP session over an IP network, a dial-up connection, a wireless connection, or any proprietary communication channel.

During operation, a user provides a source IP address and a destination IP address to the system. The system simulates how a packet travels from the source to the destination through the network, and prints the relevant switch state information. For layer-3 routing information, the system queries the layer-3 switching table, which can be dynamic. For layer-2 switching information, the system queries the Address Resolution Protocol (ARP) manager at a switch to map an IP address to an interface index of the switch, or looks up network topology information.

The system further performs a lookup against the network topology for layer-2 or sub-layer-2 switching information at a switch. Hence, the layer-2 or sub-layer-2 switching information at a switch depends on the interface status, sub-layer-2 switching table, and layer-2 or sub-layer-2 topology.

During operation, the system reads a configuration file which contains the network topology for the switch fabric. The system then performs the following steps iteratively, starting from the switch coupled to the source host, until the system reaches the switch coupled to the destination host:

1. Determine whether the current-hop node performs layer-3, layer-2, or sub-layer-2 switching based on the network topology information or the node's ingress interface, and obtain the next hop and egress interface information. If layer-3 switching information is desired, query the layer-3 switching table of the current switch chip. If layer-2 or sub-layer-2 switching information is desired, query the network topology information.

2. Query the current switch chip's Interface Manager to check the egress interface status. If the egress interface is down, stop. Otherwise, print the next-hop switch information.
3. Move to the next-hop switch and repeat steps 1-2, until the system reaches the destination host.

In one embodiment, the system simulates a switch's behavior when multiple equal-cost paths are present. That is, the system can simulate the equal-cost multiple-path scheme adopted by a switch to discover the exact path taken by a packet. In one embodiment, the system performs a hash function on the values of given fields of a packet to select one of the paths. Furthermore, the system can indicate every possible path for the same source-destination pair, thereby facilitating monitoring of the switches along each path.

In a further embodiment, a switch is identified by a switch ID. Within a switch chip, each port on the chip is identified by a port ID. Typically, a lookup against a switch chip's layer-3 or network topology information returns a port ID. Since a port ID is only locally significant to the chip, the Interface Manager uses a globally unique interface index to identify interfaces on a chip. Furthermore, the network topology information maps a port ID to an interface index.

Figure 4:
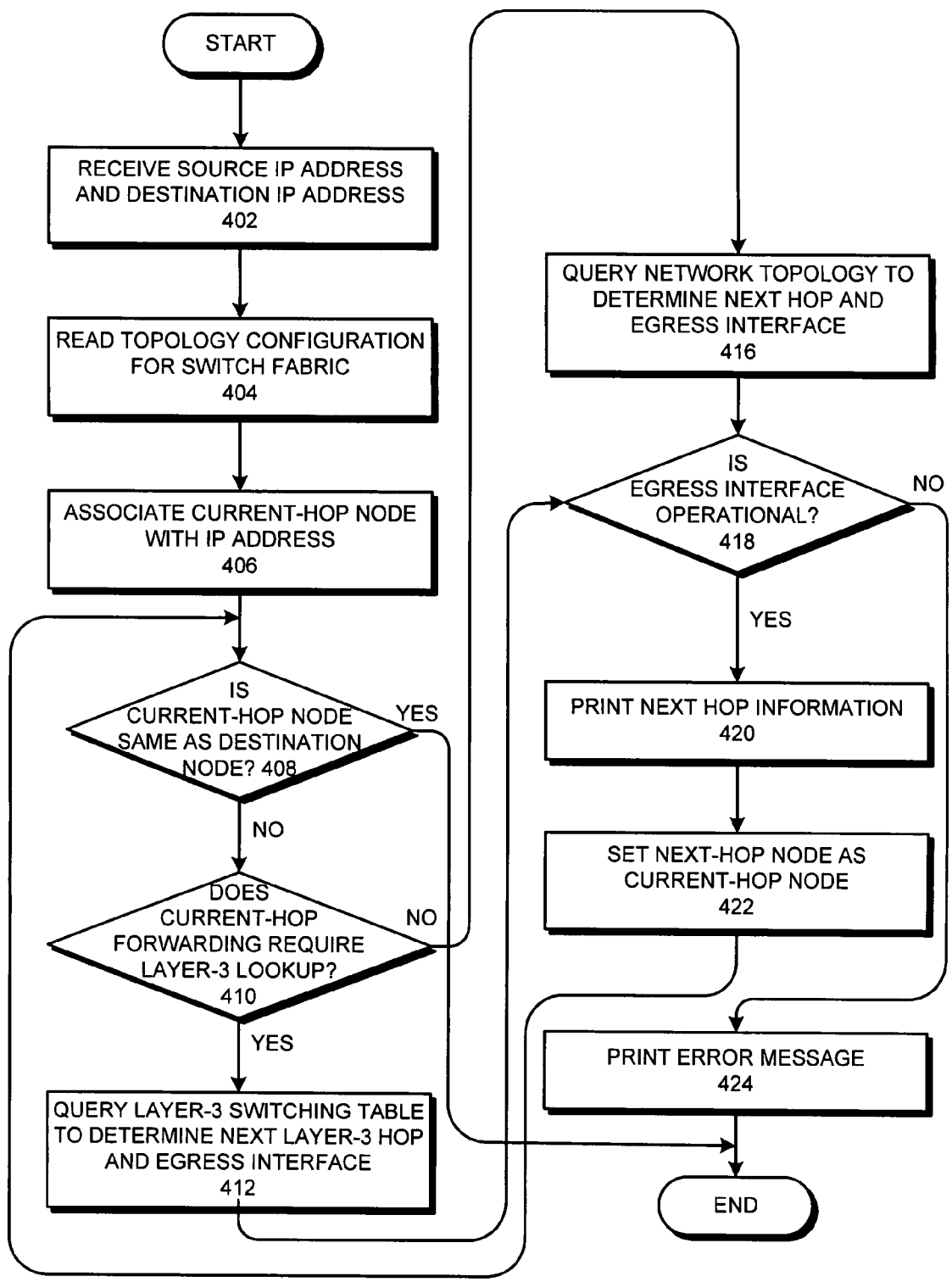
FIG. 4 presents a high-level flow chart illustrating the process of discovering a network path which includes layer-3, layer-2, and sub-layer-2 switches in accordance with an embodiment of the present invention.

FIG. 4 presents a high-level flow chart illustrating the process of discovering a network path which includes layer-3, layer-2, and sub-layer-2 switches in accordance with an embodiment of the present invention. During operation, the system starts by receiving the source IP address and the destination IP address (step 402). The system further reads the topology configuration for the switch fabric (step 404), and associates the current-hop node with the source IP address (step 406).

The system subsequently determines whether the current-hop node is the same as the destination node (step 408). If the same, the system exits. Otherwise, the system further determines whether the current-hop node performs layer-3, layer-2, or sub-layer-2 switching. In one embodiment, the system first determines whether forwarding of the packet at the current-hop node requires layer-3 lookup (step 410), by looking up the network topology information. If layer-3 lookup is necessary, the system queries the layer-3 switching table to determine the next layer-3 hop's IP address. If both the source and destination nodes are connected to the same switch, the system then obtains the egress interface index by querying an ARP table (step 412) and further determines whether the egress interface is operational by querying an Interface Manager (step 418).

If layer-3 lookup is not necessary, the system determines whether layer-2 or sub-layer-2 lookup is necessary based on the network topology. Further, the system queries the network topology to determine the next-hop node and the corresponding egress interface (step 416).

Next, the system determines whether the egress interface is operational (step 418). If not operational, the system prints an error message (step 424) and exits. If the egress interface is operational, the system prints the next-hop node information (step 420) and sets the next-hop node as the current-hop node (step 422). The system then repeats the process (step 408) until it reaches the destination node. The system then displays each node's IP address and/or node identifier, ingress interface identifier, and egress identifier along the traversed path.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying network switches along a path, the method comprising:
   receiving an address of a source node and an address of a destination node;
   maintaining topology information for a network;
   determining whether a current-hop node performs layer-3, layer-2 or sub-layer-2 switching by looking up the network topology information;
   determining the status of the current-hop node and discovering a next-hop node by querying the current-hop node;
   setting the next-hop node as the current-hop node; and
   recording identifiers for all the switches along a path from the source node to the destination node;
   wherein if the current-hop node performs layer-3 switching, the method further comprises:
      querying the current-hop node's layer-3 switching table;
      receiving from the current-hop node an address of the next layer-3 node along the path;
      identifying an egress interface at the current-hop node; and
      determining the status of the identified egress interface.

2. The method of claim 1, wherein sending the query to the current-hop node includes sending the query over a separate control channel.

3. The method of claim 1,
   wherein identifying an egress interface at the current-hop node includes querying an Address-Resolution Protocol (ARP) table to obtain an interface index; and
   wherein determining the status of the egress interface at the current-hop node includes querying an Interface Manager for the status of the identified egress interface.

4. The method of claim 1,
   wherein determining whether the current-hop node performs layer-3, layer-2, or sub-layer-2 switching includes determining whether the current-hop node performs only sub-layer-2 switching based on the topology information; and
   wherein if the current-hop node performs only sub-layer-2 switching, the method further comprises:
      looking up the network topology information;
      identifying an egress interface at the current-hop node; and
      determining the status of the identified egress interface at the current-hop node.

5. The method of claim 1, wherein if the current-hop node returns multiple next-hop layer-3 nodes which result in multiple paths leading to the destination node, the method further comprises simulating an equal-cost multiple-path selection scheme to discover an exact paths.

6. The method of claim 1, further comprising displaying each node's address and/or node identifier, ingress interface identifier, and egress interface identifier along the path.

7. A computer-readable storage medium being a non-transitory signal storing instructions that when executed by a computer cause the computer to perform a method for identifying network switches along a path, the method comprising:
   receiving an address of a source node and an address of a destination node;
   maintaining topology information for a network;
   determining whether a current-hop node performs layer-3, layer-2 or sub-layer-2 switching by looking up the network topology information;

determining the status of the current-hop node and discovering a next-hop node by querying the current-hop node;
setting the next-hop node as the current-hop node; and
recording identifiers for all the switches along a path from the source node to the destination node;
wherein if the current-hop node performs layer-3 switching, the method further comprises:
querying the current-hop node's layer-3 switching table;
receiving from the current-hop node an address of the next layer-3 node along the path;
identifying an egress interface at the current-hop node; and
determining the status of the identified egress interface.

8. The computer-readable storage medium being a non-transitory signal of claim 7, wherein sending the query to the current-hop node includes sending the query via a separate control channel.

9. The computer-readable storage medium being a non-transitory signal of claim 7,
wherein identifying an egress interface at the current-hop node includes querying an Address-Resolution Protocol (ARP) table to obtain an interface index; and
wherein determining the status of the egress interface at the current-hop node includes querying an Interface Manager for the status of the identified egress interface.

10. The computer-readable storage medium being a non-transitory signal of claim 7,
wherein determining whether the current-hop node performs layer-3, layer-2, or sub-layer-2 switching includes determining whether the current-hop node performs only sub-layer-2 switching based on the topology information; and
wherein if the current-hop node performs only sub-layer-2 switching, the method further comprises:
looking up the network topology information;
identifying an egress interface at the current-hop node; and
determining the status of the identified egress interface at the current-hop node.

11. The computer-readable storage medium being a non-transitory signal of claim 7, wherein if the current-hop node returns multiple next-hop layer-3 nodes which result in multiple paths leading to the destination node, the method further comprises simulating an equal-cost multiple-path selection scheme to discover an exact path.

12. The computer-readable storage medium being a non-transitory signal of claim 7, wherein the method further comprises displaying each node's address and/or node identifier, ingress interface identifier, and egress interface identifier along the path.

13. A computer system for identifying network switches along a path, the computer system comprising:
a processor;
a memory;
an input mechanism configured to receive an address of a source node and an address of a destination node;
a storage mechanism configured to maintain topology information for a network;
a first decision mechanism configured to determine whether a current-hop node performs layer-3, layer-2, or sub-layer-2 switching by looking up the network topology information;
a second decision mechanism configured to determine the status of the current-hop node and to discover a next-hop node;
an iteration mechanism configured to set the next-hop node as the current-hop node; and
a recording mechanism configured to record identifiers for all the switches along a path from the source node to the destination node;
wherein if the current-hop node performs layer-3 switching, the method further comprises:
querying the current-hop node's layer-3 switching table;
receiving from the current-hop node an address of the next layer-3 node along the path;
identifying an egress interface at the current-hop node; and
determining the status of the identified egress interface.

14. The computer system of claim 13, wherein while sending the query to the current-hop node, the query mechanism is configured to send the query over a separate control channel.

15. The computer system of claim 13,
wherein while identifying an egress interface at the current-hop node, the egress-interface identification mechanism is configured to query an ARP table to obtain an interface index; and
wherein while determining the status of the egress interface at the current-hop node, the third decision mechanism is configured to query an Interface Manager for the status of the identified egress interface.

16. The computer system of claim 13,
wherein while determining whether the current-hop node performs layer-3, layer-2, or sub-layer-2 switching, the first decision mechanism is configured to determine whether the current-hop node performs only sub-layer-2 switching based on the topology information; and
wherein if the current-hop node performs only sub-layer-2 switching:
the query mechanism is configured to look up the network topology information; and
the computer system further comprises:
an egress-interface identification mechanism configured to identify an egress interface at the current-hop node; and
a third decision mechanism configured to determine the status of the identified egress interface at the current-hop node.

17. The computer system of claim 13, wherein if the current-hop node returns multiple next-hop layer-3 nodes which result in multiple paths leading to the destination node, the simulation mechanism is configured to simulate an equal-cost multiple-path selection scheme to discover an exact path.

18. The computer system of claim 13, further comprising a display mechanism configured to display each node's address and/or node identifier, ingress interface identifier, and egress interface identifier along the path.

* * * * *